(12) United States Patent
Teyssedre et al.

(10) Patent No.: US 11,444,041 B2
(45) Date of Patent: Sep. 13, 2022

(54) PROCESS OF REALIZATION OF AN AREA OF INDIVIDUALIZATION OF AN INTEGRATED CIRCUIT

(71) Applicant: COMMISSARIAT A L'ENERGIE ATOMIQUE ET AUX ENERGIES ALTERNATIVES, Paris (FR)

(72) Inventors: Hubert Teyssedre, Grenoble (FR); Stefan Landis, Grenoble (FR); Michael May, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/216,794

(22) Filed: Mar. 30, 2021

(65) Prior Publication Data
US 2021/0375794 A1    Dec. 2, 2021

(30) Foreign Application Priority Data

Mar. 30, 2020    (FR) ...................................... 20 03110

(51) Int. Cl.
*H01L 23/00* (2006.01)
*H01L 21/768* (2006.01)

(52) U.S. Cl.
CPC ...... *H01L 23/573* (2013.01); *H01L 21/76816* (2013.01); *H01L 21/76817* (2013.01)

(58) Field of Classification Search
None
See application file for complete search history.

(56) References Cited

U.S. PATENT DOCUMENTS

| | | | |
|---|---|---|---|
| 2005/0214398 A1* | 9/2005 | Meissl | B29C 43/003 425/186 |
| 2007/0275556 A1 | 11/2007 | Bietsch et al. | |
| 2012/0328773 A1 | 12/2012 | Duerig et al. | |
| 2013/0009287 A1 | 1/2013 | Duerig et al. | |

(Continued)

OTHER PUBLICATIONS

French Preliminary Search Report dated Feb. 18, 2021 in French Application 20 03110 filed on Mar. 30, 2020, citing documents AA-AF therein, 10 pages (with English Translation of Categories of Cited Documents & Written Opinion).

*Primary Examiner* — Alexander G Ghyka
(74) *Attorney, Agent, or Firm* — Oblon, McClelland, Maier & Neustadt, L.L.P.

(57) ABSTRACT

A method for producing an individualisation area includes providing at least a first level of the electrical tracks. The method includes depositing a dielectric layer and a deformable layer on the interconnection level. The method includes producing, in an area of the deformable layer, recessed patterns, by penetrating an imprint mould into the deformable layer, the production of the patterns being configured so that the patterns have a randomness in the deformable layer, thus forming random patterns. The method includes transferring the random patterns into the dielectric layer to form transferred random patterns therein and exposing the vias located in line with the transferred random patterns. The method includes filling the transferred random patterns with an electrically conductive material so as to form electrical connections between vias. The method includes producing a second level of the electrical tracks on the vias and the electrical connections.

13 Claims, 10 Drawing Sheets

(56) References Cited

U.S. PATENT DOCUMENTS

| | | | |
|---|---|---|---|
| 2015/0348899 A1* | 12/2015 | Feng | H01L 21/7684 |
| | | | 257/774 |
| 2016/0254227 A1 | 9/2016 | Leobandung | |
| 2016/0254235 A1 | 9/2016 | Leobandung | |
| 2018/0375670 A1 | 12/2018 | May et al. | |
| 2020/0066628 A1* | 2/2020 | Ronay | H01L 21/486 |
| 2020/0135663 A1* | 4/2020 | Landis | H01L 21/31144 |
| 2021/0082475 A1* | 3/2021 | Chen | H01L 23/528 |
| 2022/0028802 A1* | 1/2022 | Posseme | H01L 21/31144 |

* cited by examiner

PROCESS OF REALIZATION OF AN AREA OF INDIVIDUALIZATION OF AN INTEGRATED CIRCUIT

TECHNICAL FIELD

The present invention relates to the individualisation of integrated circuits. It finds a particularly advantageous application in the protection of integrated circuits, components or devices integrating such circuits.

TECHNICAL BACKGROUND

The individualisation of an integrated circuit in a component allows the unique identification of that component. This allows, for example, to protect the component against attacks by emulating the functions that the component is supposed to perform.

In order to uniquely identify an integrated circuit, there are solutions aiming at using the functional dispersions inherent in the integrated circuits. The resistances of metal interconnection lines or vias differ from circuit to circuit, causing voltage drops along the path taken by the electrical signal. The response time of the signals therefore differs due to the variability induced in the propagation times of the signals at the limits of the electronic constraints of the circuit, or else due to the instability at start-up of components such as for example SRAMS (acronym of Static Random Access Memory) memories which have a unique state at each start-up.

However, these solutions are very sensitive to environmental variations or to ageing. In particular, changes in temperature, supply voltages or electromagnetic interference can affect the performance of these solutions by reducing their robustness. Thus, the response times of an integrated circuit can change over time. As a result, a legitimate circuit can potentially be declared to be counterfeit.

Other solutions have been proposed, for example in patent documents US2016/254228 and US21018/375670. These solutions prove to be complex and time consuming to implement. They induce a high cost price.

There is therefore a need to limit, or else resolve, the problems of known solutions.

SUMMARY

To achieve this objective, according to one embodiment provision is made of a method for producing an individualisation area on an integrated circuit, the integrated circuit being intended to comprise at least:
a first and a second level of the electrical tracks,
an interconnection level located between the first and second levels of the electrical tracks and including vias intended to electrically connect the tracks of the first level with the tracks of the second level.
The method comprising at least the following steps:
providing at least the first level of the electrical tracks,
depositing a dielectric layer then a deformable layer on the interconnection level,
producing, in an area of the deformable layer intended to comprise the individualisation area, recessed patterns, by penetrating an imprint mould into the deformable layer, the production of the patterns being configured so that the patterns have a randomness in the deformable layer, thus forming random patterns and that at least some random patterns extend in line with at least two vias of the interconnection level,
transferring the random patterns into the dielectric layer to form patterns therein, referred to as transferred random patterns, and exposing the vias located in line with the transferred random patterns,
filling the transferred random patterns with an electrically conductive material so as to form electrical connections between vias,
producing the second level of the electrical tracks on the vias and the electrical connections.

Thus, the proposed method allows to deliberately but randomly degrade the level of the vias by creating, in a defined area of this level, random short-circuits between the vias. The response diagram of the integrated circuit will therefore be closely linked to this randomness. This response will therefore be unique, thus forming an individualisation area for the integrated circuit. Each integrated circuit produced by this method thus generates a different response. Moreover, the response diagram of the integrated circuit will be stable over time, unlike the solutions described above in the section relating to the prior art.

The individualisation area is hardly clonable, or even physically uclonable. It can be qualified by the acronym PUF (from the word Physically Unclonable Function). It is therefore possible to make the integrated circuit including this individualisation area unique.

The method according to the invention thus provides a reliable solution, which can be easily implemented and at a reduced cost, in order to produce an individualisation area of an integrated circuit.

According to one example, the method comprises at least the following steps: providing a mould having initial reliefs; achieving a random collapse of the initial reliefs so as to form random reliefs. Thus, imprinting these random reliefs in the deformable layer will give a randomness to the patterns imprinted in the deformable layer.

Conventionally, the mould can be obtained by moulding a layer from a master mould, usually referred to as master. As part of the development of the present invention, it has been found that each moulding step carried out from the master is unique, at least at the molecular level.

Indeed, the behaviour of the materials at the interface between the master and the mould in formation has, for the same pattern of the master, variations between two successive mould productions. For example, the non-stick layer, usually covering the reliefs carried by the master and which directly contact the mould material, deteriorates or wears with each mould produced. For example, the critical dimension of the same master pattern and/or the roughness of the walls of the same master pattern varies between two moulding steps.

Two moulds made successively from the same master therefore have patterns including variations, even small ones.

As part of the development of the present invention, it has also been noted that these variations cannot be controlled and that they are random.

Moreover, in the field of microelectronics, it is known that patterns, in particular resin patterns, can collapse. Pattern collapse is a problem that is naturally sought to be avoided. This problem is particularly significant when trying to define patterns of small dimensions. Some parameters, such as the geometry of the patterns or the materials of the layer, promote the collapse of these patterns.

As part of the development of the present invention, it has been noticed that the variations observed on the reliefs of two moulds made from the same master impact the collapse of these reliefs.

Thus, the proposed method allows, in a perfectly counter-intuitive way, to take advantage of the collapse of the reliefs of a mould, when this collapse is usually combated by all means. Moreover, the method takes advantage of the fact that the reliefs of two moulds made from the same master have variations which give this collapse a randomness.

Particularly advantageously, the proposed method thus allows to obtain, in a deformable layer imprinted by such a mould, random patterns. The area formed is thus unique and not physically identically reproducible. These random patterns are used to form short circuits between vias. The response of the integrated circuit therefore depends on these randomly distributed short circuits. This response is therefore also random and allows to characterise the integrated circuit in a unique manner.

Optionally, the mould manufacturing method may further have at least any one of the following features which may be taken separately or in combination:

Before the step of providing a mould having initial reliefs, the following steps are carried out:
  providing a master having reliefs,
  penetrating a layer of deformable material into the reliefs of the master in order to reproduce the initial reliefs therein, the layer of deformable material forming at least part of the mould having the initial reliefs.

The initial reliefs have parameters selected so as to promote the randomness of the collapse, the parameters being taken at least from: a ratio of the shape of the initial reliefs, a critical dimension of the initial reliefs, a material constituting the initial reliefs, a Young's modulus of the initial reliefs, the temperature of the initial reliefs. For example, by changing the temperature the behaviour of reliefs is changed and therefore their resistance to collapse.

The reliefs of the master are covered with a non-stick layer and the step of separating the mould and the master is carried out so that molecules of the non-stick layer remain on the reliefs of the mould after separation of the mould and the master. This greatly promotes the random collapse of the patterns.

To achieve the random collapse of the initial reliefs, the reliefs are penetrated into a deformable layer.

Another aspect relates to a method for producing a microelectronic device including at least one integrated circuit, the integrated circuit including at least:
  a first and a second level of the electrical tracks,
  an interconnection level located between the first and second levels of the electrical tracks and including vias intended to electrically connect tracks of the first level with tracks of the second level
  an integrated circuit individualisation area.

The individualisation area is produced by implementing the method described above, preferably on only part of the integrated circuit.

Microelectronic device means any type of device produced with microelectronic means. These devices incorporate in particular, in addition to purely electronic devices, micromechanical or electromechanical devices (MEMS, NEMS, . . . ) as well as optical or optoelectronic devices (MOEMS, . . . ). It may be a device intended to perform an electronic, optical, mechanical function, etc. It may also be an intermediate product intended only for the production of another microelectronic device.

BRIEF DESCRIPTION OF THE DRAWINGS

The purposes, objects, as well as the features and advantages of the invention will become more apparent from the detailed description of an embodiment thereof which is illustrated by the following appended drawings wherein.

Figure 1:
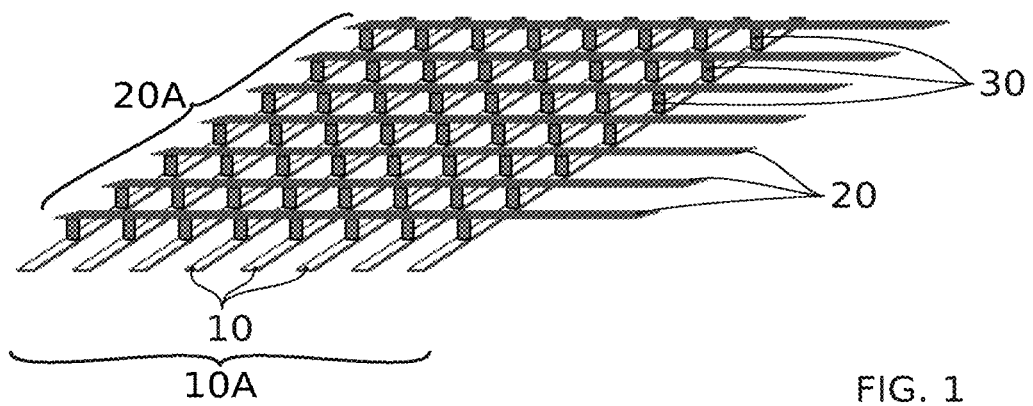
FIG. 1 shows, schematically and in perspective, an integrated circuit comprising a first and a second level of the electrical tracks, as well as an interconnection level comprising vias. The vias electrically connect electrical tracks of the first level with electrical tracks of the second level.

The drawings are given by way of example and are not limiting of the invention. They constitute schematic principle representations intended to facilitate the understanding of the invention and are not necessarily on the scale of practical applications. In particular, on the principle diagrams, the thicknesses of the various layers, vias, patterns and reliefs are not representative of reality.

DETAILED DESCRIPTION

Before starting a detailed review of embodiments of the invention, optional features are listed below which may optionally be used in combination or alternatively:

According to one example, the initial reliefs have a shape ratio greater than or equal to 2 and preferably greater than or equal to 5 and preferably greater than or equal to 10.

According to one example, the randomness of the random patterns relates to at least one of: a main orientation of each random pattern in a plane parallel to a front face of the deformable layer, a dimension of the random patterns taken according to their direction of main orientation, a critical dimension of the random patterns.

According to one example, said production of the patterns so that the patterns have a randomness in the deformable layer, comprises the following steps:

providing said nanoimprint mould, said mould having a front face carrying initial reliefs, achieving a random collapse of the initial reliefs so as to form random reliefs, penetrating the front face of the mould into the deformable layer to leave the random patterns therein.

According to one example, the step of achieving the random collapse of the initial reliefs of the mould being carried out before and/or during the penetration of the front face of the mould into the deformable layer.

According to one example, the step of achieving the random collapse of the initial reliefs of the mould is carried out, at least partly and preferably only, before the penetration of the mould into the deformable layer.

According to one example, the initial reliefs are dipped in a liquid before the penetration of the mould into the deformable layer. This greatly promotes the random collapse of the patterns.

According to another example, the step of achieving the random collapse of the initial reliefs of the mould is carried out, at least partly and preferably only, during the penetration of the mould into the deformable layer. According to one example, the random collapse of the initial reliefs is obtained by the penetration of the initial reliefs into the deformable layer.

According to another example, the step of achieving the random collapse of the initial reliefs of the mould is carried out partly before the penetration of the mould into the deformable layer and partly during the penetration of the mould into the deformable layer.

According to one example, the production of random patterns is carried out in one or more areas only of the deformable layer, this or these areas do not extend over the entire deformable layer. Thus, the individualisation area does not extend over the entire deformable layer. It does not extend over, that is to say in line with, all the tracks of the first level of electrical tracks. Thus, the first level of the electrical tracks is covered by the individualisation area and by another area, intended to form a functional area for the integrated circuit.

The production of the random patterns is carried out only in the at least one individualisation area. The integrated circuit has at least one other area, distinct from the individualisation area, preferably intended to form a functional area for the integrated circuit. This other area has a larger surface than the surface of the individualisation area. The first and second levels of electrical tracks as well as the interconnection level extend into said at least one other area.

It is specified that, in the context of the present invention, the term via encompasses all the electrical connections such as the pads, lines and conductive structures which extend, preferably perpendicularly, between two layers, which are successive or not, of the integrated circuit, or between two levels of electrical tracks. Each level of the electrical tracks extends mainly in a plane and may include functional micromechanical structures such as transistors for example. Preferably, the vias each form a stud, of substantially circular section.

In the context of the present invention, a via has a critical dimension $CD_{via}$, for example a diameter, taken in a section parallel to the various levels of the integrated electrical tracks. Preferably, $CD_{via}$ is less than 50 µm. Preferably $CD_{via}$ is comprised between 10 nm and 50 µm. Preferably $CD_{via}$ is comprised between 10 nm and 10 µm.

It is specified that, within the context of the present invention, the terms "on", "surmounts", "covers", "underlying", "opposite" and their equivalents do not necessarily mean "in contact with". Thus for example, the deposition, the transfer, the bonding, the assembly or the application of a first layer on a second layer, does not necessarily mean that the two layers are directly in contact with one another, but means that the first layer at least partially covers the second layer by being either directly in contact therewith, or by being separated therefrom by at least one other layer or at least one other element.

A layer can moreover be made of several sub-layers of the same material or of different materials.

A substrate, a film, a layer, "based" on a material A, means a substrate, a film, a layer comprising only this material A or this material A and possibly other materials, for example dopant elements.

The term "flexible mould" encompasses semi-flexible moulds and fully flexible moulds. In general, the Young's modulus and the thickness of each layer of the flexible mould are configured so that a flexible mould has sufficient bending flexibility to allow an elasticity allowing to press the mould by rolling.

For example, a flexible mould can at least be deformed with a radius of curvature of 1 m without breaking. In another example, a fully flexible mould deforms under the effect of its own weight. Thus, if a fully flexible mould is held by its periphery, an arrow is observed, preferably greater than the thickness of the mould. This arrow being caused by the weight of the mould alone. A semi-flexible mould is more rigid than a flexible mould. It generally has a rigid sheet forming a support. Nevertheless, it can bend elastically to be rolled to transfer its patterns into an imprintable layer.

Several embodiments of the invention implementing successive steps of the manufacturing method are described below. Unless explicitly stated, the adjective "successive" does not necessarily imply, although this is generally preferred, that the steps follow each other immediately, intermediate steps being able to separate them.

Moreover, the term "step" means carrying out part of the method, and can designate a set of sub-steps.

Moreover, the term "step" does not necessarily mean that the actions carried out during a step are simultaneous or immediately successive. In particular, some actions of a first step can be followed by actions related to a different step, and other actions of the first step can be repeated afterwards. Thus, the term step does not necessarily mean actions which are unitary and inseparable over time and over the sequence of the phases of the method.

The word "dielectric" denotes a material whose electrical conductivity is low enough in the given application to be used as an insulator. In the present invention, a dielectric material preferably has a dielectric constant of less than 7.

The term "selective etching with respect to" or "etching having selectivity with respect to" means an etching configured to remove a material A or a layer A with respect to a material B or a layer B, and having an etching speed of a material A greater than the etching speed of a material B. Selectivity is the ratio between the etching speed of material A to the etching speed of material B.

In the context of the present invention, an organic or organo-mineral material that can be shaped by exposure to a beam of electrons, photons or X-rays or mechanically is called a resin.

Mention may be made, for example, of resins conventionally used in microelectronics, resins based on polystyrene (PS), methacrylate (for example Polymethyl methacrylate PM MA), Hydrosilsesquioxane (HSQ), polyhydroxystyrene (PHS) etc. The advantage of using a resin is that it is easy to deposit a significant thickness thereof, from several hundred nanometres to several microns.

It is specified that in the context of the present invention, the thickness of a layer or of the substrate is measured in a direction perpendicular to the surface along which this layer or this substrate has its maximum extension. The thickness is taken in a direction perpendicular to the main faces of the substrate on which the different layers rest. In the figures, the thickness is taken along the vertical.

An element located "vertically above" or "in line with" another element means that these two elements are both located on the same line perpendicular to a plane wherein a lower or upper face of a substrate mainly extends, that is to say on the same line oriented vertically in the figures.

FIG. 1 schematically shows a conventional integrated circuit including a first level 10A of the electrical tracks 10, and a second level 20A of the electrical tracks 20. Each of these levels 10A, 20A extends mainly in a plane. These planes are substantially parallel to each other and to a substrate, not shown, on which these first 10A and second 20A levels of the electrical tracks are based. The integrated circuit also comprises an interconnection level configured to electrically connect tracks of the first level 10A with tracks of the second level 20A. This interconnection level comprises conductive portions generally referred to as vias 30. It will be noted that vias 30 can connect tracks of two levels which are not adjacent but which are themselves separated by one or more other levels.

Figure 2A:
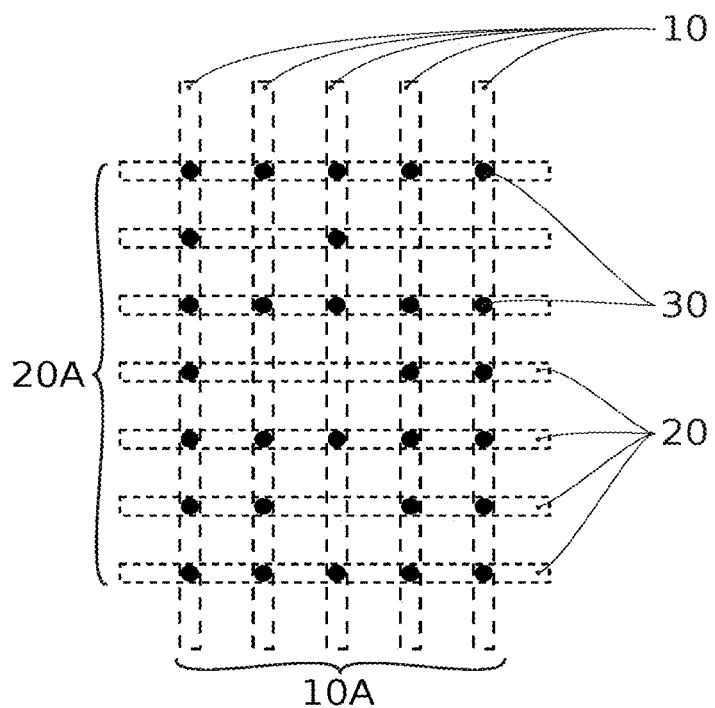
FIG. 2A shows, schematically and in top view, a functional area of an integrated circuit, the electrical tracks of the second level being shown in transparency.
Figure 2B:
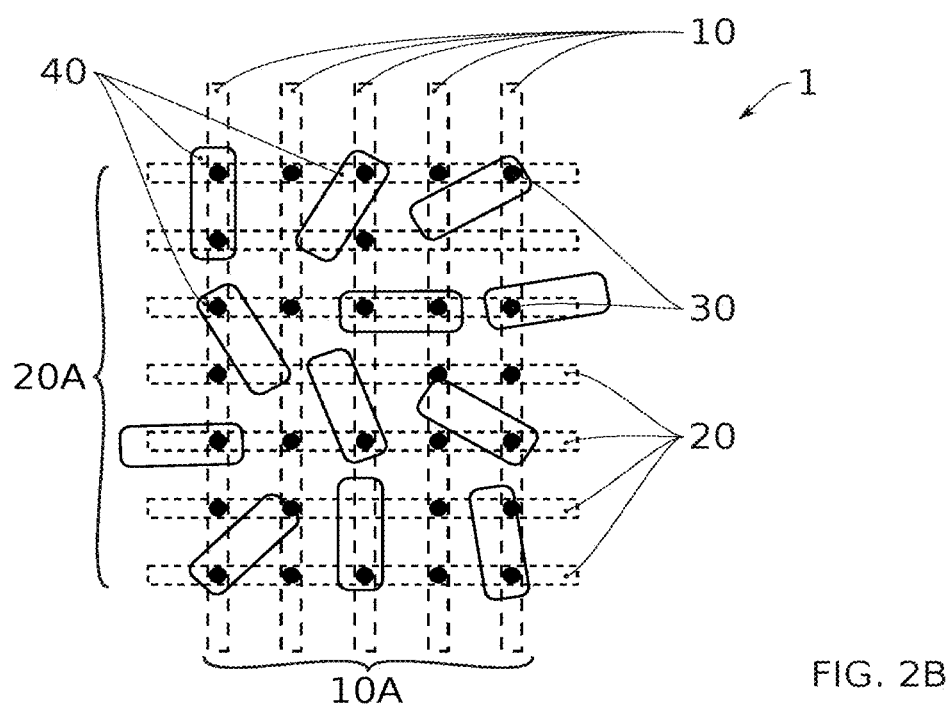
FIG. 2B schematically shows a top view of an individualisation area of an integrated circuit, the individualisation area being obtained by implementing a method according to the invention. The electrical tracks of the second level are shown in transparency. The same integrated circuit can comprise the functional and individualisation areas illustrated respectively in FIGS. 2A and 2B.

A portion of the integrated circuit forms at least one functional area 2 illustrated in FIG. 2A and another portion of the integrated circuit forms at least one individualisation area 1 illustrated in FIG. 2B.

The functional area 2 is intended to provide logic functions for the expected operation of the integrated circuit. In addition to the electrical tracks 10, 20, this functional area 2 can comprise microelectronic structures, such as for example transistors, diodes, MEMS etc.

The individualisation area 1 has the function of making each integrated circuit unique. To this end, and as will be detailed later, during the manufacturing method, provision is made to randomly degrade the interconnection level comprising the vias 30. More specifically, provision is made to randomly create electrical connections 40 between the vias 30 to short-circuit them. The response diagram of the integrated circuit is then dependent on the position of these electrical connections 40 creating short circuits. The response of each integrated circuit will therefore be different. Each integrated circuit can therefore be identified in a unique manner. FIG. 2B illustrates the randomness of these electrical connections 40. In this example, this randomness relates to the orientation of the electrical connections 40 in a plane parallel to the planes of the first 10A and second 20A levels of electrical tracks.

According to an exemplary embodiment, the randomness of the electrical connections 40 is obtained by imprinting random patterns in a deformable layer deposited on the vias 30. After having exposed the vias 30 located in line with the random patterns, the latter are filled with a conductive material to create an electrical short circuit. According to an exemplary embodiment, the random patterns are obtained by imprinting the deformable layer with a mould having random reliefs. The randomness of these reliefs of the mould is obtained by a random collapse of the initial reliefs carried by the mould. As will be seen later in the detailed description which follows, the random collapse of the initial reliefs of the mould can be obtained either before contacting the mould with the deformable layer, or during imprinting of the mould in the deformable layer, or both before contacting the mould with the deformable layer and both during imprinting of the mould in the deformable layer.

Collapse of a relief of the mould means a displacement of a distal portion of the relief with respect to the front face of the mould carrying the relief. For example, it may be a displacement of a distal part of this relief while a proximal part of this relief, through which the relief is linked to the base of the mould, remains in place. This collapse can lead to a fold in the relief, a break in the relief, an inclination of the relief, a flattening of the reliefs on a front face of the mould. This collapse can also lead to a flattening of the reliefs on a front face of the mould and on the neighbouring patterns.

The collapse can be caused by electrostatic forces, electromagnetic forces, near field forces. The collapse can also be caused by capillary forces.

Alternatively, the collapse can be caused by applying mechanical stress to the reliefs. This constraint can for example result from the penetration of the reliefs in a material, such as a resin.

Pattern collapse is not, or only results, from pattern creep.

The randomness of the random reliefs relates in particular to the main orientation of each random relief in a plane parallel to a front face of the mould. Alternatively or cumulatively, the randomness of the random reliefs relates to at least one of:

the shape of the random reliefs;

one or more dimensions of the random reliefs, these dimensions being taken in a main direction of orientation of the random reliefs.

A non-limiting example of an embodiment of an integrated circuit including an individualisation area 1 and a functional area 2 will now be described in detail with reference to FIGS. 3A to 3I.

The individualisation area 1 can be qualified as a PUF area and the functional area 2 can be qualified as a non-PUF area.

The example described below fits into the manufacturing of semiconductor compounds at the back end, that is to say when producing the electrical interconnection levels.

Figure 3A:
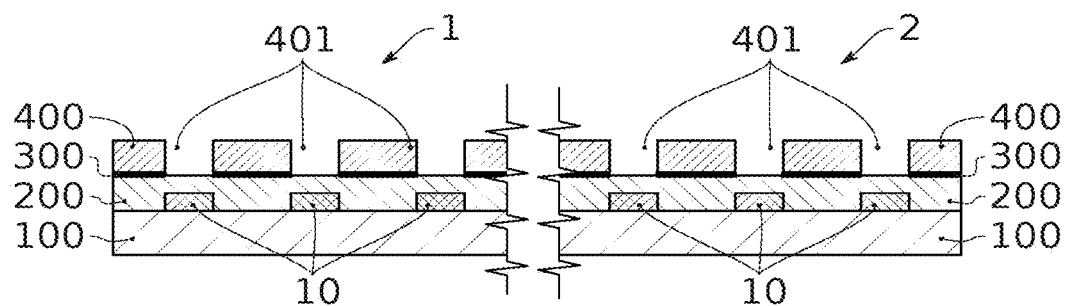
FIGS. 3A to 3I illustrate steps of an embodiment of an integrated circuit according to the present invention.

FIG. 3A illustrate a step wherein a plate is provided, also referred to as a stack, including an area intended to form an individualisation area 1 and an area intended to form the functional area 2. This stack comprises:

a support layer 100, made of a dielectric material, for example a dielectric substrate. This support layer 100 is for example formed from $SiO_2$;

the first level 10A of electrical tracks 10. These electrical tracks 10 are formed from a conductive material such as copper;

at least one dielectric layer 200 encapsulating the first level 10A of the electrical tracks 10. This dielectric layer also has the function of forming a barrier against the diffusion of copper. This dielectric layer 200 is for example formed from $SiO_2$.

Optionally, the stack can also comprise a mask 300 having openings exposing the dielectric layer 200. Preferably, the mask 300 is a hard mask. This hard mask is for example formed of a nitride such as silicon nitride (SiN). Alternatively, this hard mask 300 is for example formed of a stack of at least two layers. In this case, the hard mask 300 can comprise a first layer disposed in contact with or opposite the electrical layer 200 and a second layer surmounting the first layer. According to one example, the first layer is an oxide such as silicon oxide (SiO$_2$) and the second layer is a nitride such as silicon nitride (SiN). This mask can be qualified as a bilayer mask.

The mask 300 is surmounted by a mask 400 having openings 401. It is these openings 401 of the mask 400 which are used to open the hard mask 300. These openings in the masks 300, 400 have the function of defining during a later step, the vias 30. The openings 401 are located in line with the electrical tracks 10.

The nature of the mask 400 depends on the techniques used to make the openings 401. FIG. 3A illustrates a uniform mask 400. Obviously, this mask 400, where the layer from which this mask 400 is formed, may be formed from a stack of layers. For example, to obtain the mask 400, a layer comprising two etching mask layers of SOC (spin on carbon) and SiARC (silicon anti reflective coating) type, as well as a layer of photosensitive resin can be deposited on the hard mask 300. The thicknesses of these three layers vary according to the nature of the products used as well as the dimensions of the vias targeted. They are typically of the order of 150 nm for SOC, 30 nm for SiARC and around 100 nm for the resin.

Alternatively, the mask 400 can be formed from a simple resin stack comprising a resin layer and a BARC (Bottom Anti Reflective Coating) type coating.

Preferably, these layers are deposited by a conventional spin coating method (with a spinner).

This stack, in particular the hard mask 300 and the resin mask 400 are produced by implementing conventional lithography techniques, such as optical lithography, electron beam lithography (ebeam), nanoimprint lithography or any other lithography technique known to the person skilled in the art.

For example, to produce the openings of the mask 300 by optical lithography, some areas of the resin mask 400 can be exposed, then, after development, the openings 401 are obtained. These openings 401 then allow to etch the hard mask 300 in line with the openings 401.

Figure 3B:
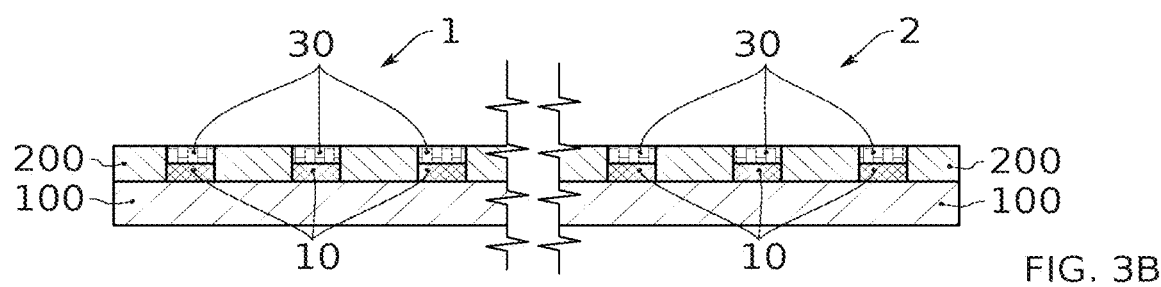

To obtain the result illustrated in FIG. 3B, an etching is carried out in the dielectric layer 200 in order to transfer the patterns 401 of the mask 400 therein. This etching is carried out so as to remove the dielectric layer 200 located in line with the openings 401 so as to expose the electrical tracks 10.

A subsequent step consists in forming the vias 30 by filling with an electrical material, for example copper, the recesses formed in the electrical layer 200. The vias 30 are in contact with the electrical tracks 10. Thus, the interconnection level is achieved.

Figure 3C:
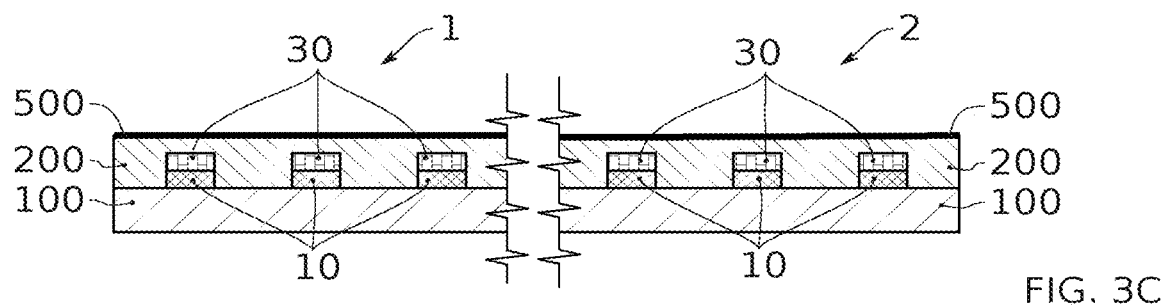

As illustrated in FIG. 3C, a new layer is then deposited on this interconnection level, the function of which is to form a barrier to copper diffusion. This layer is for example made of SiO$_2$. In FIG. 3A, this layer is illustrated as ensuring continuity with the electrical layer 200 and forming part of the latter. Obviously, there can be two distinct layers with different natures.

A hard etching mask 500 is also deposited. This hard mask is for example made of SiN.

Figure 3D:
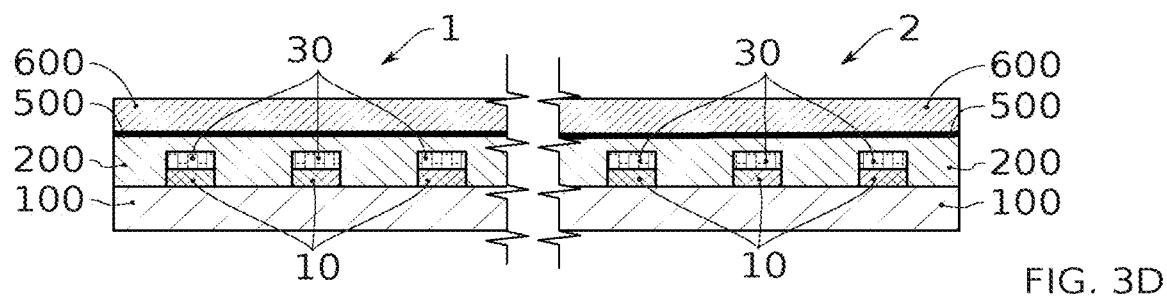

As illustrated in FIG. 3D, the next step is to deposit a deformable layer 600, typically a resin. Preferably, this deformable layer 600 is deposited full plate. It covers both the portion of the stack intended to form the individualisation area 1 and the portion of the stack intended to form the functional area 2.

This deformable layer 600 is intended to be imprinted by a mould to form random patterns in the portion intended to form the individualisation area 1. This deformable layer 600 can be made of one of the resins compatible with an ultraviolet (UV) assisted or thermally assisted imprinting technology. Preferably, this resin is selected so as to allow to carry out this lithography step at room temperature and to perform an alignment of the patterns present on the mould with respect to the levels already produced on the plate to be imprinted. These resins are well known to the person skilled in the art At this point, the individualisation area 1 and the functional area 2 are identical. The steps for producing the integrated circuit are identical for these two areas.

Figure 3E:
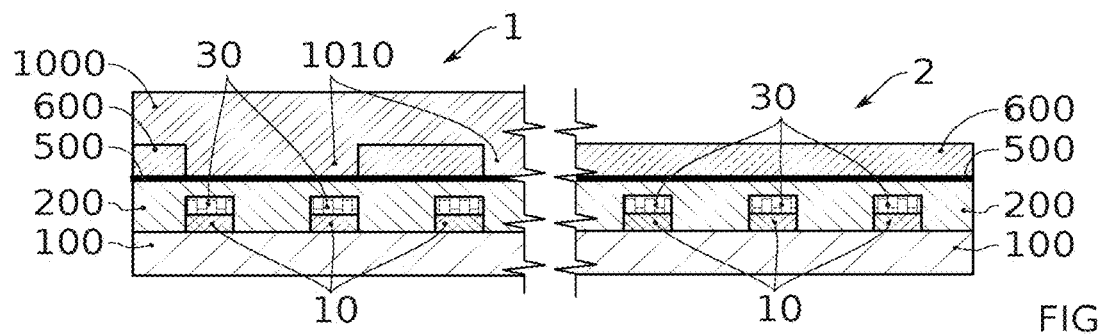

The next step, illustrated in FIG. 3E, consists in imprinting in the deformable layer 600 the reliefs 1010 carried by the mould 1000. It will be indicated below how these reliefs 1010 have a randomness in the individualisation area 1.

These reliefs 1010 generally have the shape of a rib. Thus, they have a main direction of extension, the dimension of which corresponds to the length of the relief, this length being taken in a plane parallel to the front face of the mould 1000. They also have a width, also measured in a plane parallel to the front face of the mould 1000 and in a direction perpendicular to the length. This width corresponds to the critical dimension $CD_{1010}$ of the relief 1010.

FIG. 3E is a simplified view which does not show any residual thickness of the deformable layer 600 at the end of the reliefs 1010 of the mould 1000. This step is carried out so that in the portion of the plate intended for forming the functional area 2, the mould 1000 does not imprint reliefs 1010, at least no random reliefs. In the example illustrated in FIG. 3E, in this portion, the mould 1000 does not imprint any relief.

Figure 3F:
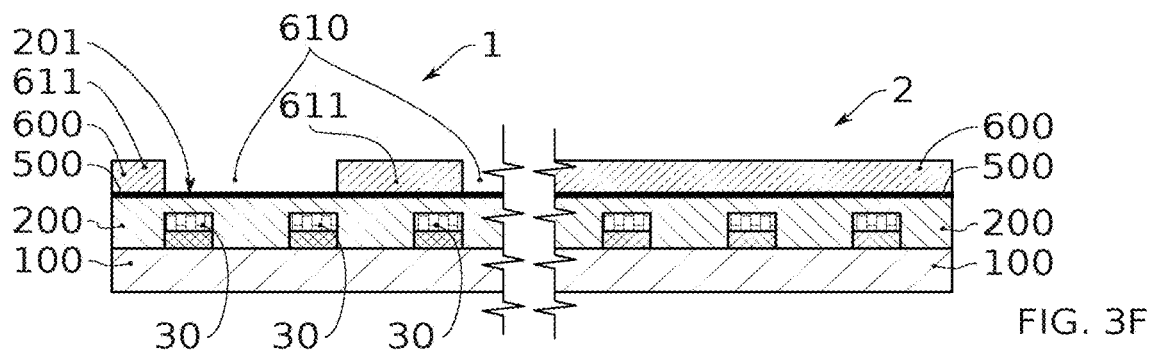

FIG. 3F illustrates the step consisting in removing the mould 1000 from the deformable layer 600. At the end of this removal, the deformable layer 600 has recessed patterns 610 and protruding patterns 611. At the end of this optional step aiming at removing the residual thickness of the layer 600 in line with the reliefs 1010, the dielectric layer 200 or more specifically the hard mask 500 is exposed in line with the patterns 610.

The recessed patterns 610 depend on the random reliefs 1010 of the mould 1000. These patterns 610 therefore each have a randomness.

Also, the mould 1000 is configured so that at least some of the random patterns 610 extend in line with at least two vias 30.

Figure 3G:
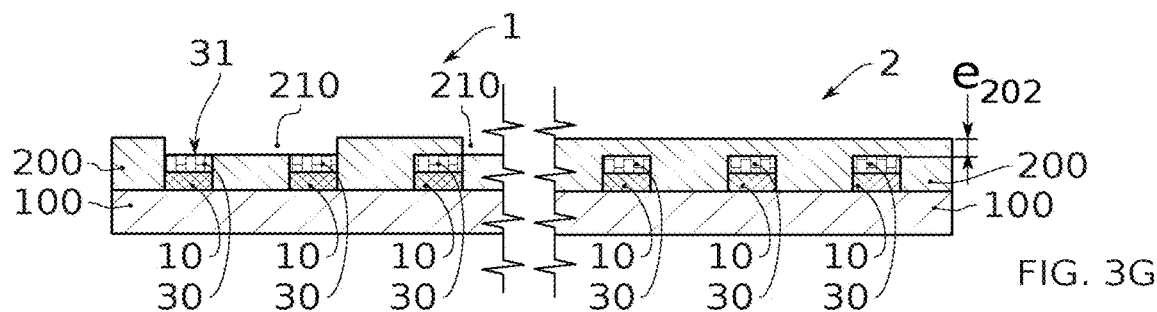

As illustrated in FIG. 3G, the random patterns 610 are then transferred into the hard mask 500 and into the dielectric layer 200, thus allowing to expose an upper face 31 of the vias 30. Patterns 210 are then formed in the electrical layer 200. Just like the patterns 610a of the deformable layer 600, these patterns 210 of the electrical layer 200 are random. Obviously, in the functional area 2, the vias 30 remain masked by the electrical layer 200. The thickness of the dielectric layer 200 covering the upper face 31 of the vias is referenced e202 in FIG. 3G.

Figure 3H:
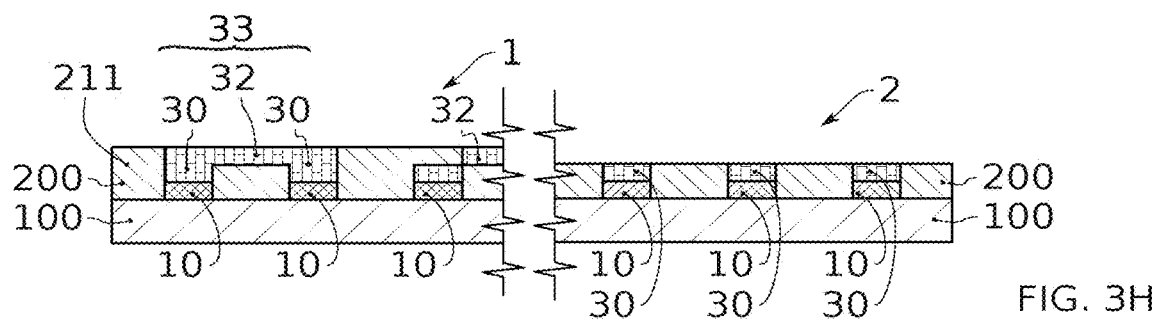

As illustrated in FIG. 3H, the patterns 210 are filled with an electrically conductive material, for example copper. This deposit 32 of electrically conductive material is then planarised, for example by chemical mechanical polishing (CMP). This deposit 32 of electrically conductive material, when it contacts at least two vias 30, allows to form an electrical connection 33 between two vias 30. It then forms a short-circuit between the electrical tracks 10 in contact with these vias 30. It is then possible to form a short-circuit between the electrical tracks 10 in contact with these vias 30. It is noted that the functional area 2 does not include an electrical connection 33 between two vias 30, and therefore no random short-circuit.

Figure 3I:
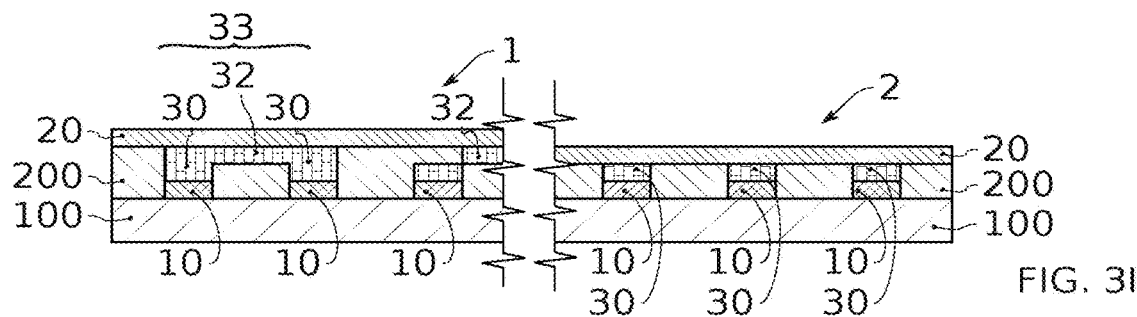

As illustrated in FIG. 3I, the upper levels can then be integrated in a conventional manner. In particular, the second level 20A of electrical tracks 20 is produced.

The following paragraphs describe an example for obtaining random reliefs 1010 on the mould 1000 used to form, by nanoimprinting, the random patterns 610 in the deformable layer 600.

This example is based on nanoimprinting technology with flexible moulds. For this purpose, a master mould is first produced, usually referred to as a master. This master is advantageously made of silicon using technologies well known to the person skilled in the art. The period of these arrays is not necessarily identical to the period of the arrays of vias 30 already made on the plate. For FIG. 2B and for the sake of simplification, the period selected for the conductive structures 32 having defects is twice that used for the level of vias 30.

Figure 4A:
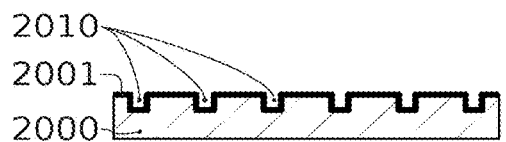
FIGS. 4A to 4D illustrate steps of an exemplary embodiment of a mould according to the present invention.
Figure 4B:
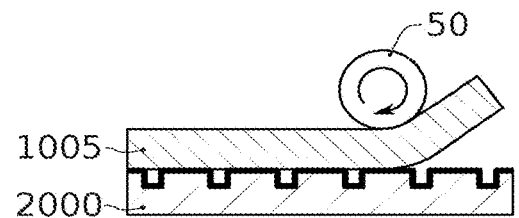
Figure 4C:
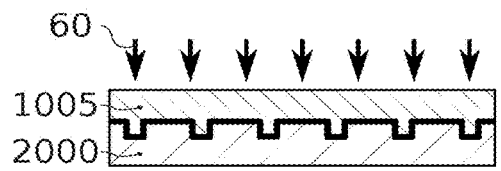

FIGS. 4A to 4C illustrate, in a very simplified manner, the main steps of producing a flexible mould 1000 from a master 2000.

As illustrated in FIG. 4A, the master 2000 has a front face carrying recessed reliefs 2010. This front face is advantageously covered with a non-stick layer 2001.

As illustrated in FIG. 4B, the reliefs 2010 of this front face of the master 2000 are subsequently copied into a deformable layer 1005. For this purpose, provision can be made to apply an imprinting method to the deformable layer 1005. According to one example, the layer of deformable material is rolled on the front face of the master, for example using a roller 50. The imprinting can be UV or thermally assisted as illustrated by the reference 60 in FIG. 4C.

Alternatively, the deformable layer 1005 is deposited by centrifugation on the master. In this case, the deformable layer 1005 may have a thickness comprised between a few hundred nanometres to several microns.

Figure 4D:
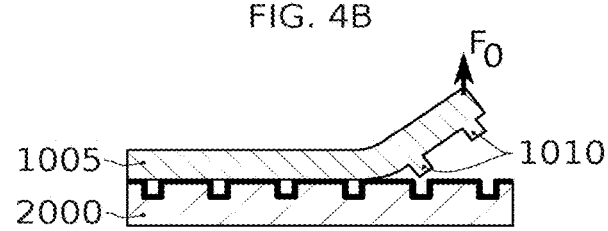

As illustrated in FIG. 4D, the deformable layer 1005 can be removed from the master 2000, for example by applying a removal force FO thereto. The deformable layer 1005 then has reliefs 1010 on its front face. The deformable layer 1005 is transferred onto a support layer to ensure its mechanical retention but also to be able to use it as a mould in a subsequent imprinting operation. The support is, for example, a polymer film, the thickness of which is comprised between a few tens of microns and several hundreds of microns. In the remainder of the description, the mould will be illustrated as being made in one piece whereas, obviously, it may have a stack of layers, in particular, the layer 1005 carrying the reliefs 1010 and the support layer. In the remainder of the description, the mould bears the reference 1000, regardless of its composition is the number of layers which compose it.

Once extracted from the master 2000, the flexible mould 1000 is copied by imprinting in a deformable layer 600 on the substrate or the plate already containing the array of vias 30 of the level N-1, as has been described with reference to FIG. 3E. However, unlike an imprinting method usually implemented, wherein the objective is to reproduce the most faithfully the reliefs 2010 present on the master 2000 in the deformable layer 600 to be imprinted, in the proposed method the objective is on the contrary to generate patterns 610 with a randomness, typically a random orientation. This randomness is obtained by a collapse of the reliefs 1010 of the flexible mould 1000, thus modifying the geometries reproduced in the layers 600 compared to the initial design defined on the master 2000.

Figure 5A:
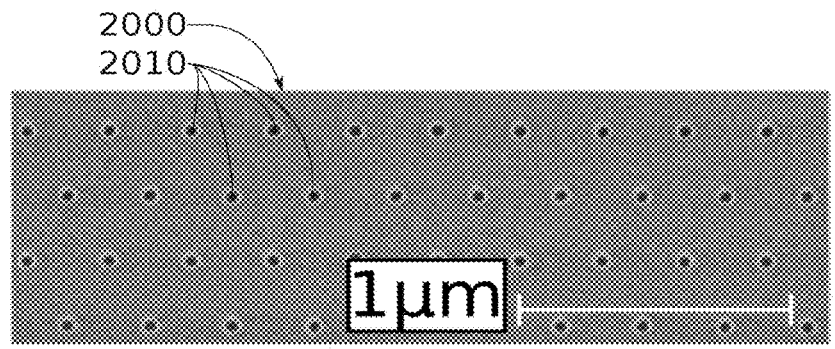
FIG. 5A is a photo of a master.
Figure 5B:
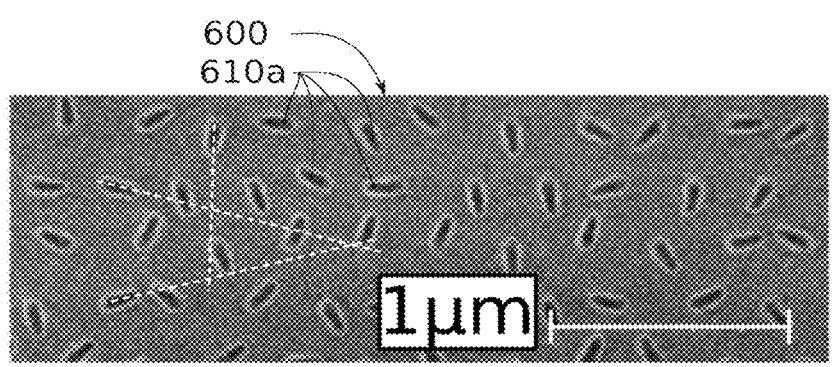
FIG. 5B is a photo of a deformable layer carrying random patterns obtained by nanoimprinting with a mould produced, according to the method of the invention and from the master illustrated in FIG. 5A.

FIG. 5A is a photo of the front face of a master 2000 carrying an array of holes 2010. FIG. 5B is a photo of the patterns 610 obtained in a deformable layer 600 by imprinting the mould manufactured using the master 2000 of FIG. 5A. It is clear from this FIG. 5B that the patterns 610 have a perfectly random orientation. This orientation can be characterised by the main direction of extension of each of the patterns 610 in a plane parallel to the main plane of the upper face of this deformable layer 600 (that is to say in a plane parallel to that of the sheet). The orientations of three patterns 610a are represented by a white dotted line in FIG. 5B. It is clear that these orientations are not parallel.

Before describing in detail embodiments of moulds allowing to form the random patterns 610 in the deformable layer 600, a few steps of a conventional method for producing a nanoimprint mould and its use will now be described briefly.

Figure 6A:
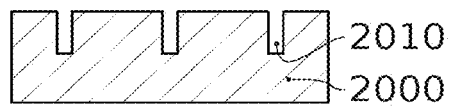
FIGS. 6A to 6G illustrate steps of an example of manufacture and use, of a mould for nanoimprinting, according to the prior art.
Figure 6B:
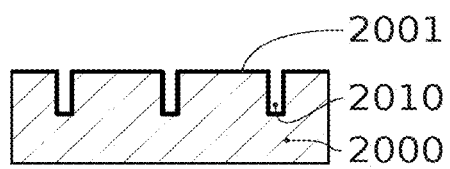
Figure 6C:
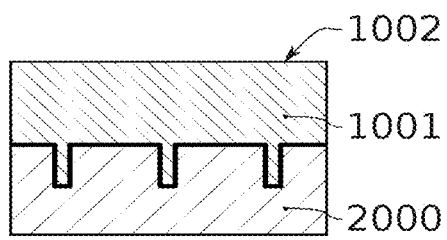
Figure 6D:
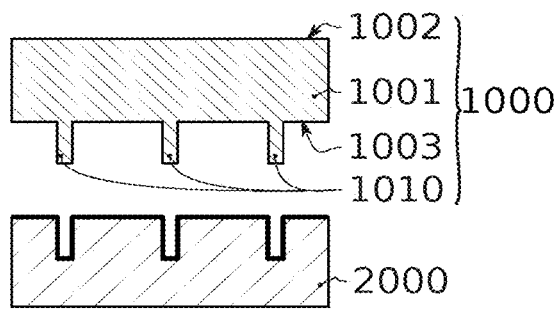

FIGS. 6A to 6D illustrate the manufacture of a mould 1000. FIG. 6A illustrates the master 2000, a front face of which carries reliefs 2010. FIG. 6B illustrates the addition to the master 2000 of a non-stick layer 2001 covering the reliefs 2010. FIG. 6C illustrates the penetration of the material of a flexible mould into the reliefs 2010 of the master 2000. FIG. 6D illustrates the separation of the flexible mould 1000 and the master 2000. The flexible mould 1000 then has a base 1001, a rear face 1002, a front face 1003 and the reliefs 1010 carried by the front face 1003.

Figure 6E:
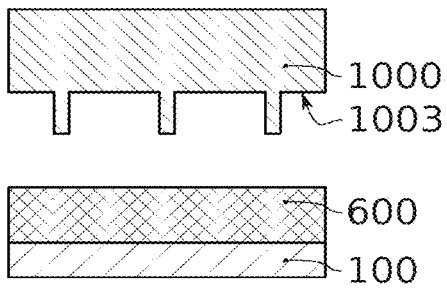
Figure 6F:
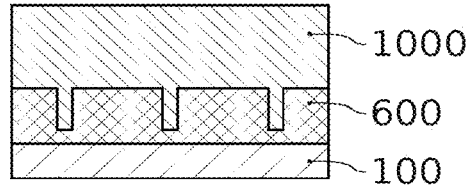
Figure 6G:
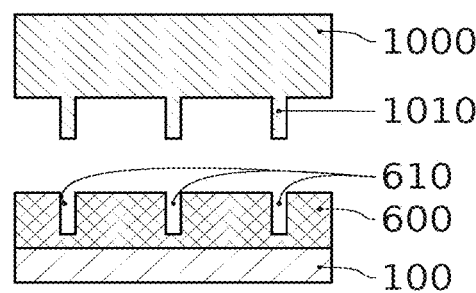

FIGS. 6E to 6G illustrate steps of using the mould 1000 to copy the patterns 2010 of the master 2000 in a deformable layer 600. In FIG. 6E, the front face 1003 of the mould 1000 is positioned in line with the deformable layer 600 resting on a substrate 100. FIG. 6F illustrates the penetration of the mould 1000 into the deformable layer 600. FIG. 6G illustrates the separation of the mould 1000 and the deformable layer 600, leaving patterns 610 in the latter.

In this method according to the prior art, the patterns 610 obtained in the deformable layer 600 are identical or as close as possible to the reliefs 2010 of the master 2000, the purpose of all the developments carried out in nanoimprinting being to have the strongest similarity between the patterns 610 of the deformable layer and the reliefs 2010 of the master 2000.

Figure 7A:
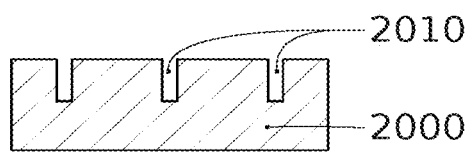
FIGS. 7A to 7G illustrate steps of an example of manufacture and use of a mould for nanoimprinting, according to a first exemplary embodiment of the present invention.
Figure 7B:
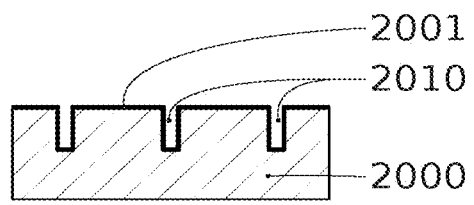
Figure 7C:
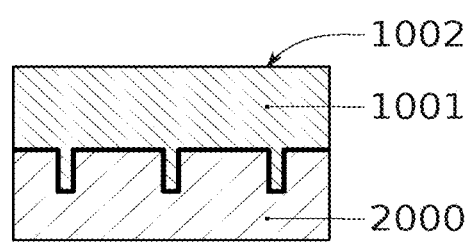
Figure 7D:
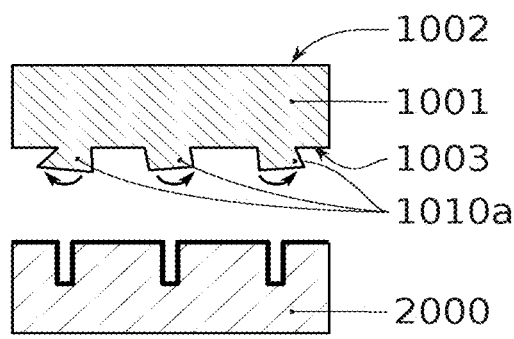

A first embodiment of a mould according to the proposed method will now be described in detail with reference to FIGS. 7A to 7G. The principle of the steps illustrated in FIGS. 7A to 7C is in accordance with the steps illustrated in FIGS. 6A to 6C described above.

On the other hand, the parameters of the reliefs 2010 of the master 2000 are selected so that after removing the mould 1000 from the master 2000, the reliefs of the mould 1000 collapse. These collapsed reliefs are referenced 1010a in FIG. 7D.

The collapse of these patterns 1010a is random. This embodiment, wherein the collapse of the patterns occurs after the step of moulding the reliefs of the mould and before the step of imprinting the mould 1000 in the deformable layer 600, has the significant advantage that it significantly promotes the randomness of this collapse.

The parameters of the reliefs 210 of the master 2000 are adjusted so as to cause or promote their random collapse. These parameters are in particular taken from:

a critical dimension of the reliefs 2010. This critical dimension is typically taken in a plane perpendicular to the front face of the master 2000, that is to say in a plane perpendicular to that of the sheet. This critical dimension is, for example, the diameter of a pattern 2010 forming a recessed cylinder. Alternatively, this critical dimension can be the width of a recessed trench.

a ratio of the shape of the relief 2010. This shape ratio corresponds to the ratio of the depth of the recessed relief 2010 of the master 2000 to the critical dimension of the relief 2010 (as described in the paragraph above). The higher the shape ratio, the higher the probability of collapse.

In order to promote the random collapse of the patterns, one can also act on the following parameters of the flexible mould 1000.

For the material forming the flexible mould 1000, a low Young's modulus will be promoted to increase the probability of collapse.

Moreover, a high adhesion of the material of the flexible mould 1000 with itself will be promoted. This promotes the stability and durability of the collapse.

The temperature of the mould material when it is removed from the master 2000 can also be adjusted to promote the collapse of the patterns.

In order to promote the random collapse of the patterns, one can also act on the non-stick layer 2001 covering the reliefs 2010 of the master 2000. It is advantageous to choose this non-stick layer 2001, in particular its nature, its thickness, its compatibility with the material of the mould 1000, its temperature, so as to generate on the walls of the mould 1000 near-field forces or stresses which promotes the collapse of the reliefs 1010. These forces and stresses are due to the molecules of the non-stick layer 2001 which remain on the reliefs 1010 of the mould during the separation of the mould 1000 and the master 2000. Moreover, during the separation of the mould 1000 and the master 2000, electromagnetic forces may appear on the reliefs 1010 of the mould 1000.

In order to promote the random collapse of the patterns, it is also possible to act on the treatment steps which take place after separation of the mould 1000 and the master 2000. For example, provision can be made to dip the flexible mould 1000 in any liquid compatible with the material of this mould. This allows to promote the collapse of the reliefs 1010 by the action of capillary forces that occur during the subsequent drying steps. For example, the mould can be immersed in water and/or alcohol, which promotes the collapse of the reliefs. Moreover, the exposure of the reliefs to water vapour alone causes or also promotes their collapse.

As indicated above, the reliefs 1010a of the mould 1000, after collapse, have at least one randomness on the surface of the plate, this randomness extends taken from: the orientation of the reliefs 1010a, one or more dimensions of the reliefs 1010a, the shape of the reliefs 1010a.

Figure 7E:
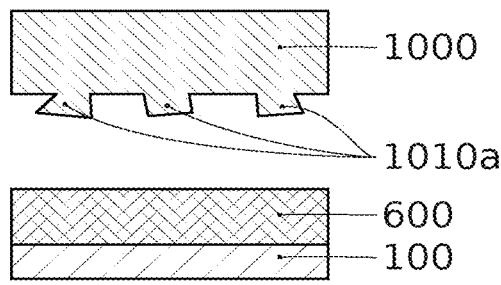
Figure 7F:
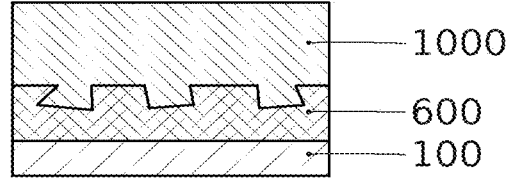
Figure 7G:
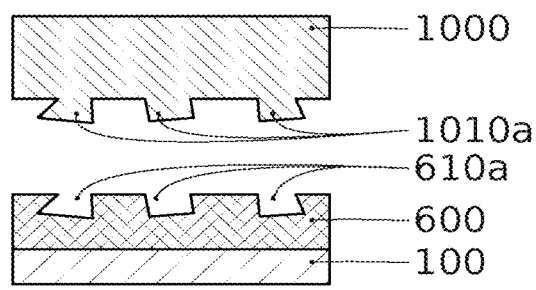
Figure 8A:
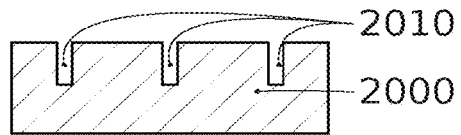
FIGS. 8A to 8G illustrate steps of an example of manufacture and use of a mould for nanoimprinting, according to a second exemplary embodiment of the present invention.
Figure 8B:
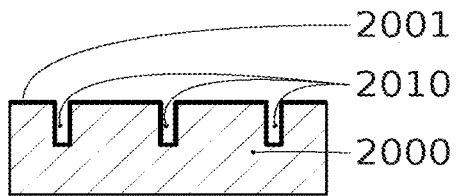
Figure 8C:
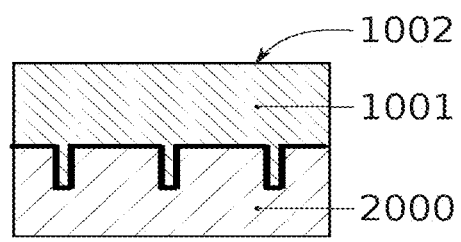
Figure 8D:
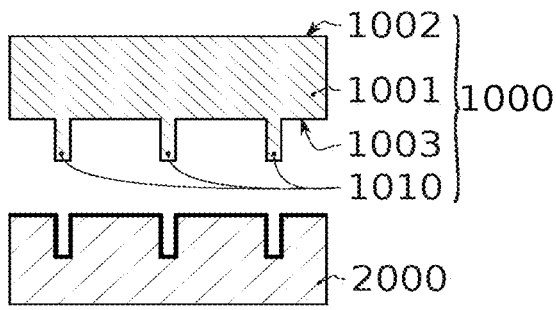
Figure 8E:
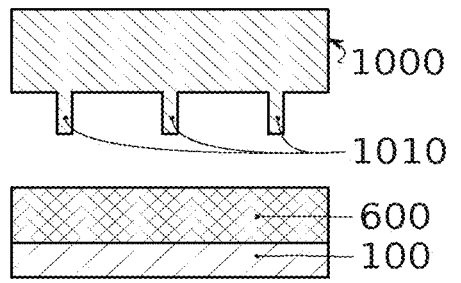
Figure 8F:
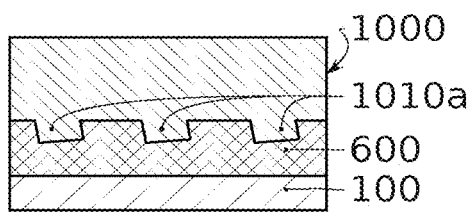
Figure 8G:
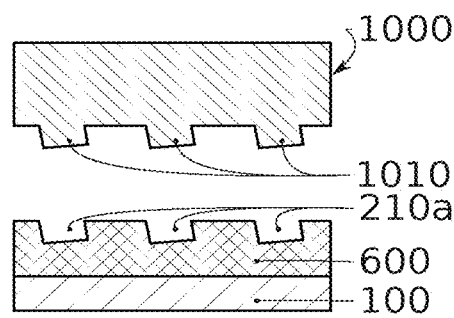

The mould 1000 carrying the random reliefs 1010a then penetrates into a deformable layer 600 (FIGS. 7E and 7F). The deformable layer 600 surmounts a stack, which, for the sake of brevity is symbolised by the substrate 100. Obviously in the embodiments of FIGS. 7 and 8, the substrate 100 can comprise a stack of layers, such as for example, but of in a non-limiting manner, the stack of layers illustrated in FIG. 3E and comprising the layers and tracks 100, 200, 500, 10, 30.

When the mould 1000 is separated from the deformable layer 600, it leaves in place in the latter random patterns 610a, corresponding to the random reliefs 1010a.

It will be noted that the patterns 610a formed in the deformable layer 600 are very different from the reliefs 2010 produced in the master 2000. The imprinting method according to the present invention is therefore a radical departure from the principle and the usual objectives of imprinting lithography.

A second embodiment of a mould according to the proposed method will now be described in detail with reference to FIGS. 8A to 8G. The principle of the steps illustrated in FIGS. 8A to 8E is in accordance with the steps illustrated in FIGS. 6A to 6E described above.

In this embodiment, the penetration of the mould 1000 into the deformable layer 600 is carried out so as to cause the reliefs to collapse. These collapsed reliefs are referenced 1010a in FIG. 8F. It will be noted that the patterns 610a formed in the deformable layer 600 are very different from the reliefs 2010 produced in the master 2000.

Figure 9:
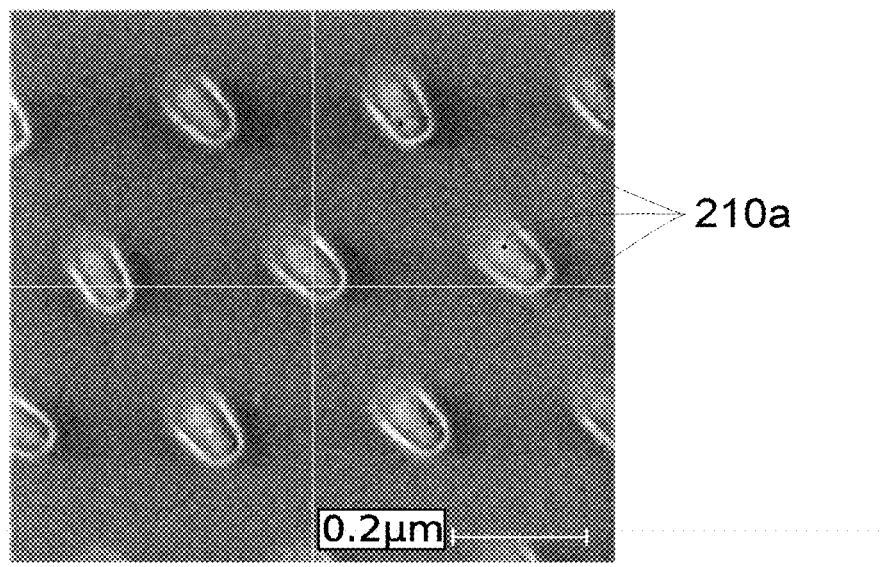
FIG. 9 is a photo of a layer imprinted with the front face of a mould carrying randomly collapsed reliefs.

FIG. 9 is a photo illustrating the patterns 210a obtained in a resin layer after imprinting this layer by a mould carrying collapsed reliefs. The reliefs of the mould formed, initially and before imprinting, vertical studs. These vertical studs collapse, during imprinting in the deformable layer 600, flattening, in a random fashion.

Obviously, provision can be made of an embodiment wherein part of the random collapse of the reliefs of the mould is carried out before pressing the mould 1000 in the deformable layer 600 and wherein the collapse of the reliefs continues during the phase of imprinting the mould 1000 in the deformable layer 600. Thus, the embodiments illustrated in FIGS. 7 and 8 can be combined during the same method.

As indicated above, the geometry of the reliefs 1010 of the mould 1000, more specifically their shape ratio, is an important parameter for their random collapse to occur. It is recalled that the shape ratio of the reliefs of the flexible mould corresponds to the ratio between the height of the relief (stud or rib) and its critical dimension $CD_{1010}$ taken in a plane parallel to the front face of the mould 1000 (diameter of the stud or width of the rib).

Figure 10:
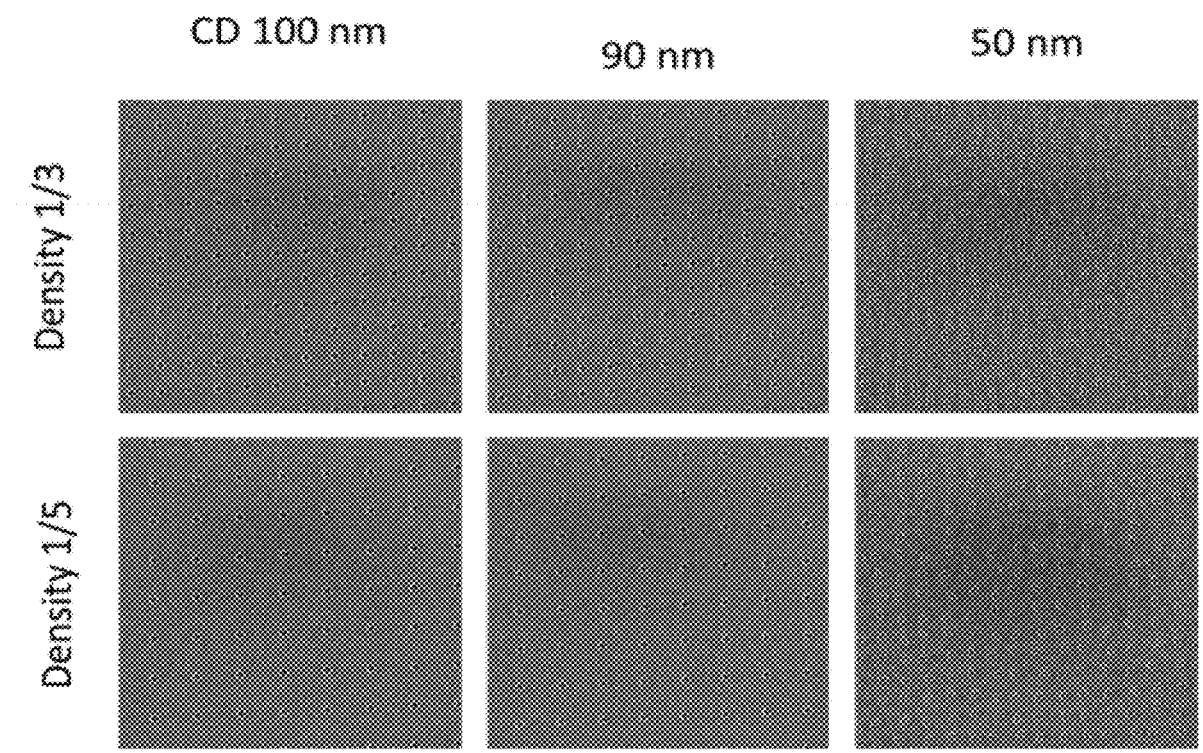
FIG. 10 includes several photos of a deformable layer carrying random patterns, each photo corresponding to a pattern density and to a critical dimension of the pattern.
Figure 11:
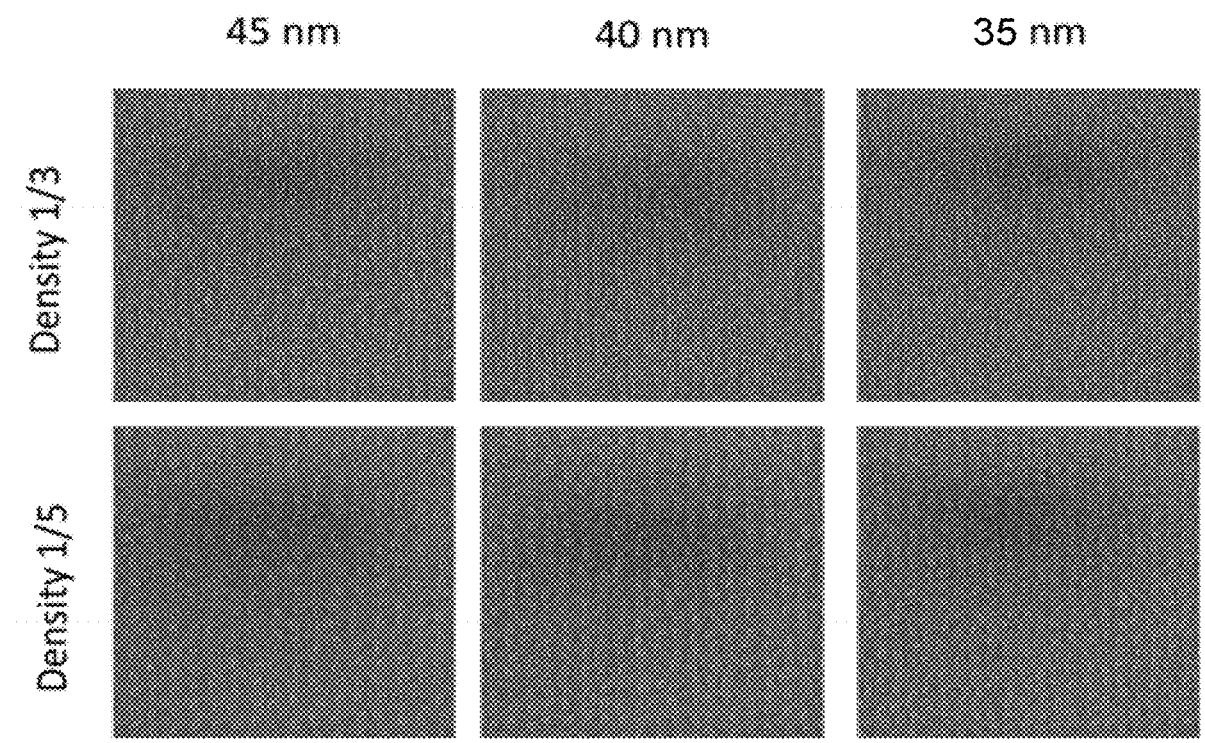
FIG. 11 includes several photos of a deformable layer carrying random patterns, each photo corresponding to a pattern density and to a critical dimension of the pattern.

FIGS. 10 and 11 illustrate the impact of the shape ratio on the random collapse of the mould reliefs. The higher this ratio, the easier the random collapse. The height of the reliefs, measured in a direction perpendicular to the face of the mould carrying the reliefs, is, in this example, 125 nm. The critical dimension of the reliefs (for example their section if the section is constant throughout the height of the relief), measured in a direction perpendicular to the height is indicated in FIGS. 10 and 11. This critical dimension CD, takes, in this example, the following values in nanometres: 100, 90, 50, 45, 40, 35. In some cases the reliefs 1010 of the mould flatten until touching between nearest neighbours in the imprinted resin. This is naturally promoted when the density of the reliefs is greater.

In view of the above description, it clearly appears that the proposed method offers a particularly effective solution for producing a PUF-type individualisation area.

The invention is not limited to the embodiments described above and extends to all the embodiments covered by the claims.

The embodiment described above fits into the manufacture of semiconductor compounds at the back end called "copper". The invention nevertheless extends to embodiments using a conductive material other than copper. For this purpose, a person skilled in the art will easily be able to make the necessary adaptations in terms of the choice of materials and the steps to proceed.

The invention claimed is:

1. A method for producing an individualisation area on an integrated circuit, the integrated circuit being intended to comprise at least:

a first and a second level of electrical tracks, an interconnection level located between the first and second levels of the electrical tracks and including vias intended to electrically connect the electrical tracks of the first level with electrical tracks of the second level, the method comprising at least the following steps:

providing at least the first level of the electrical tracks, then providing the interconnection level comprising the vias, depositing at least one deformable layer and one dielectric layer on the interconnection level, producing, in an area of the deformable layer intended to comprise the individualisation area, recessed patterns, by penetrating an imprint mould into the deformable layer, the production of the recessed patterns being configured so that the patterns have a randomness in the deformable layer, thus forming random patterns and that at least some random patterns extend in line with at least two vias of the interconnection level, transferring the random patterns into the dielectric layer to form transferred random patterns therein and exposing the vias located in line with the transferred random patterns, filling the transferred random patterns with an electrically conductive material so as to form electrical connections between vias, producing the second level of the electrical tracks on the vias and the electrical connections, and said production of the patterns so that the patterns have a randomness in the deformable layer, comprises the following steps:

providing said imprint mould, said mould having a front face carrying initial reliefs, achieving a random collapse of the initial reliefs so as to form random reliefs, penetrating the front face of the mould into the deformable layer to leave the random patterns therein, the step of achieving the random collapse of the initial reliefs of the mould being carried out before and/or during the penetration of the front face of the mould into the deformable layer.

2. The method according to claim 1, wherein the initial reliefs have a shape ratio greater than or equal to 2 and preferably greater than or equal to 5.

3. The method according to claim 1, wherein the step of achieving the random collapse of the initial reliefs of the mould is carried out, at least partly and preferably only, before the penetration of the mould into the deformable layer.

4. The method according to claim 3, wherein the initial reliefs are dipped in a liquid before the penetration of the mould into the deformable layer.

5. The method according to claim 1, wherein the step of achieving the random collapse of the initial reliefs of the mould is carried out, at least partly and preferably only, during the penetration of the mould into the deformable layer.

6. The method according to claim 5, wherein the random collapse of the initial reliefs is obtained by the penetration of the initial reliefs into the deformable layer.

7. The method according to claim 1, wherein the step of achieving the random collapse of the initial reliefs of the mould is carried out partly before the penetration of the mould into the deformable layer and partly during the penetration of the mould into the deformable layer.

8. The method according to claim 1, wherein the production of the random patterns is carried out only in at least one individualisation area, and the integrated circuit has at least one other area, distinct from the individualisation area, preferably intended to form a functional area for the integrated circuit, the first and the second levels of electrical tracks as well as the interconnection level extending into said at least one other area.

9. The method according to claim 1, comprising the following steps carried out before the step of providing the imprint mould:

providing a master having reliefs, penetrating a layer of deformable material into the reliefs of the master in order to reproduce the initial reliefs of the mould therein, the layer of deformable material forming at least part of the mould having the initial reliefs, separating the mould and the master.

10. The method according to claim 9, wherein the initial reliefs have parameters selected so as to promote the randomness of the collapse, the parameters being taken from: a shape ratio of the initial reliefs, a critical dimension of the initial reliefs, a material constituting the initial reliefs, a Young's modulus of the initial reliefs, and a temperature of the initial reliefs.

11. The method according to claim 9, wherein the reliefs of the master are covered with a non-stick layer and the step of separating the mould and the master is carried out so that molecules of the non-stick layer remain on the initial reliefs of the mould after separation of the mould and the master.

12. The method according to claim 9, wherein to achieve the random collapse of the initial reliefs, the initial reliefs of the mould are penetrated into a deformable layer or in a liquid.

13. A method for producing a microelectronic device including at least one integrated circuit, the integrated circuit including at least:

a first and a second level of the electrical tracks, an interconnection level located between the first and second levels of the electrical tracks and including vias intended to electrically connect the tracks of the first level with the tracks the second level, an individualisation area produced by implementing the method according to claim 1 on only part of the integrated circuit, and a functional area distinct from the individualisation area and comprising microelectronic structures taken from transistors, diodes, MEMS or MOEMS.

* * * * *